United States Patent
Xia et al.

(10) Patent No.: US 12,192,769 B2
(45) Date of Patent: Jan. 7, 2025

(54) METHODS AND APPARATUS FOR SECURING COMMUNICATIONS

(71) Applicant: Huawei Technologies Co., Ltd., Shenzhen (CN)

(72) Inventors: Pengfei Xia, San Diego, CA (US); Bin Liu, San Diego, CA (US); Young Hoon Kwon, Laguna Niguel, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 17/621,195

(22) PCT Filed: Aug. 22, 2019

(86) PCT No.: PCT/US2019/047691
§ 371 (c)(1),
(2) Date: Dec. 20, 2021

(87) PCT Pub. No.: WO2020/091879
PCT Pub. Date: May 7, 2020

(65) Prior Publication Data
US 2022/0369111 A1    Nov. 17, 2022

(51) Int. Cl.
H04W 12/122    (2021.01)
H04B 7/0408    (2017.01)
H04L 1/00    (2006.01)
H04L 5/00    (2006.01)
H04W 16/28    (2009.01)

(52) U.S. Cl.
CPC ........ *H04W 12/122* (2021.01); *H04B 7/0408* (2013.01); *H04L 1/0071* (2013.01); *H04L 5/0051* (2013.01); *H04W 16/28* (2013.01)

(58) Field of Classification Search
CPC ... H04W 12/122; H04W 16/28; H04W 12/03; H04B 7/0408; H04B 7/086; H04B 7/0617; H04L 1/0071; H04L 5/0051; H04L 63/1475; H04L 63/18; H04L 63/0435; H04K 1/10
See application file for complete search history.

(56) References Cited

U.S. PATENT DOCUMENTS 6,976,166 B2 * 12/2005 Herley ................ H04K 1/00
380/54
9,985,903 B2 * 5/2018 Shalev .................... H04L 69/22
10,911,403 B1 * 2/2021 Delaney ................ H04L 63/18
(Continued)

FOREIGN PATENT DOCUMENTS

GB    2099962 A    5/1981
WO    WO-2009116169 A1 *    9/2009 ......... H04L 63/0428

OTHER PUBLICATIONS

"3rd Generation Partnership Project; Technical Specification Group Radio Access Network; Evolved Universal Terrestrial Radio Access (E-UTRA); Multiplexing and channel coding (Release 12)," 3GPP TS 36.212, V12.3.0, Dec. 2012, 89 pages.

*Primary Examiner* — John B King
(74) *Attorney, Agent, or Firm* — Slater Matsil, LLP

(57) ABSTRACT

A method includes generating an encoded and secured message comprising at least two parts, and transmitting the at least two parts of the encoded and secured message over at least two beam pair links (BPLs) associated with the first device and the second device, each part of the at least two parts being transmitted over a single BPL.

24 Claims, 8 Drawing Sheets

(56) References Cited

U.S. PATENT DOCUMENTS

| | | | |
|---|---|---|---|
| 2003/0133423 A1* | 7/2003 | LaDue | H04L 1/0071 370/330 |
| 2003/0208693 A1* | 11/2003 | Yoshida | H04L 67/565 713/150 |
| 2004/0095907 A1* | 5/2004 | Agee | H04B 7/10 370/400 |
| 2009/0055704 A1* | 2/2009 | Saito | H03M 13/293 714/752 |
| 2009/0158052 A1* | 6/2009 | Yasuda | H04L 63/0435 726/30 |
| 2010/0299313 A1* | 11/2010 | Orsini | G06F 21/602 707/652 |
| 2012/0151544 A1 | 6/2012 | Schein et al. | |
| 2012/0224691 A1* | 9/2012 | Purohit | H04L 1/04 380/255 |
| 2013/0242922 A1* | 9/2013 | Suzuki | H04L 1/0041 370/329 |
| 2013/0286960 A1 | 10/2013 | Li et al. | |
| 2018/0049042 A1* | 2/2018 | Yu | H04B 7/088 |
| 2018/0220398 A1* | 8/2018 | John Wilson | H04B 7/0695 |
| 2018/0227102 A1* | 8/2018 | John Wilson | H04L 5/001 |
| 2018/0249526 A1* | 8/2018 | Nagaraja | H04W 24/08 |
| 2018/0323845 A1 | 11/2018 | Chang et al. | |
| 2018/0368004 A1* | 12/2018 | Subramanian | H04B 7/063 |
| 2018/0368125 A1* | 12/2018 | Cezanne | H04W 72/046 |
| 2019/0034646 A1* | 1/2019 | Fujiwara | H04L 63/0428 |
| 2019/0069167 A1* | 2/2019 | Rowell | H04L 63/18 |
| 2020/0100219 A1* | 3/2020 | Takeda | H04W 72/23 |
| 2020/0373991 A1* | 11/2020 | Zhou | H04W 76/19 |

* cited by examiner

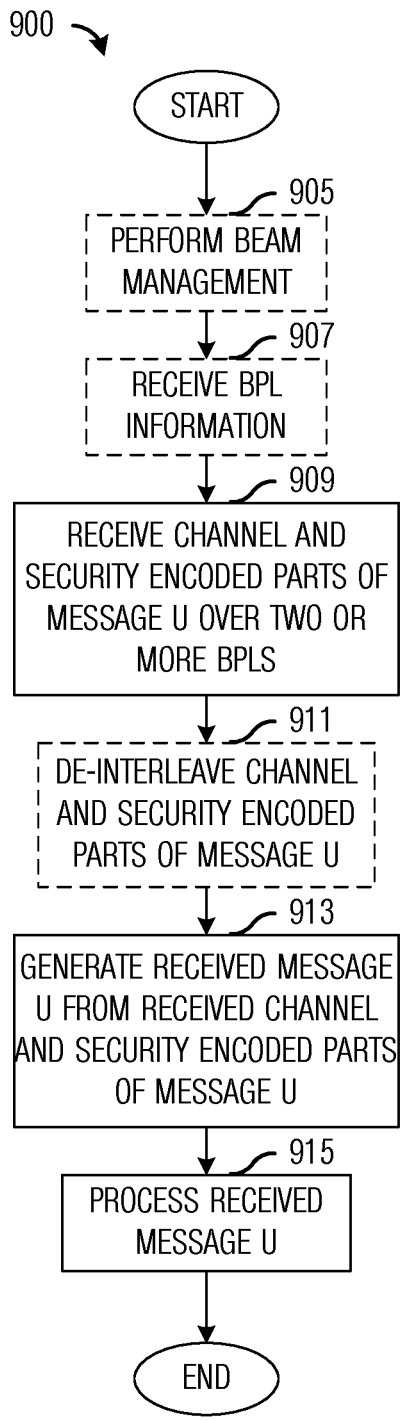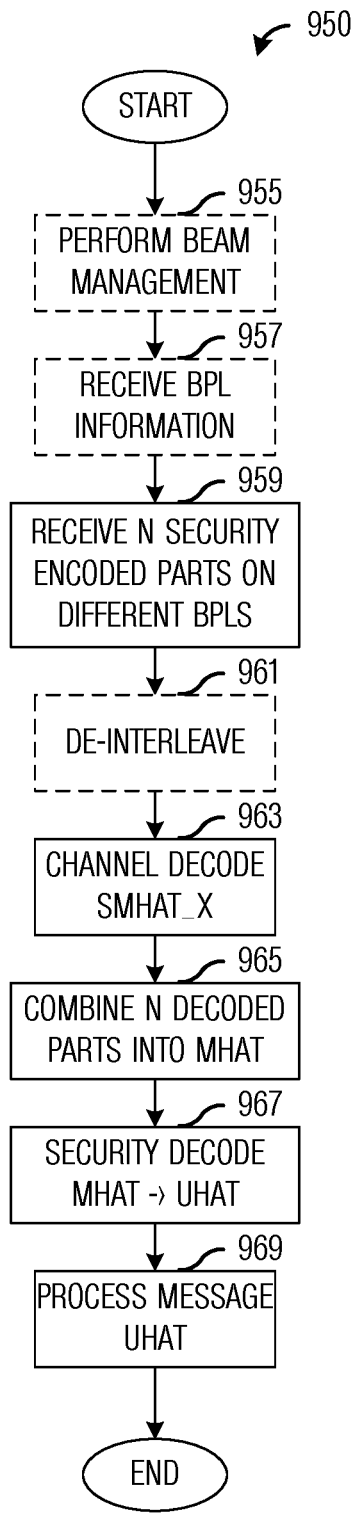
Fig. 9A
Fig. 9B

METHODS AND APPARATUS FOR SECURING COMMUNICATIONS

CROSS-REFERENCE TO RELATED APPLICATIONS

This patent application is a national phase filing under section 371 of PCT Application PCT/US2019/047691, filed on Aug. 22, 2019, which application is hereby incorporated herein by reference.

TECHNICAL FIELD

The present disclosure relates generally to methods and apparatus for digital communications, and, in particular embodiments, to methods and apparatus for securing communications.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

Beamformed beams are typically directional in nature. The directional nature of the beams may complicate communications. As an example, communicating devices with one or more misaligned beams can suffer from temporal link quality degradation. Therefore, there is a need for system and method for adaptive beam control.

Securing transmissions to prevent unintended recipients from receiving and decoding the transmissions is a topic of much research. Securing transmissions may occur at a high network layer with strong encryption codes. However, using strong encryption codes incurs significant processing and communications overhead. Therefore, there is a desire to secure transmissions at lower network layers, where the processing and communications overhead may be lower.

SUMMARY

According to a first aspect, a method implemented by a first device is provided. The method comprising generating, by the first device, an encoded and secured message comprising at least two parts, and transmitting, by the first device, to a second device, the at least two parts of the encoded and secured message over at least two beam pair links (BPLs) associated with the first device and the second device, each part of the at least two parts being transmitted over a single BPL.

In a first implementation form of the method according to the first aspect as such, generating the encoded and secured message comprising encoding, by the first device, a message, thereby producing an encoded message, splitting, by the first device, the encoded message into at least two encoded parts, and securing, by the first device, the at least two encoded parts, thereby producing the encoded and secured message comprising the at least two parts.

In a second implementation form of the method according to the first aspect as such or any preceding implementation form of the first aspect, generating the encoded and secured message comprising splitting, by the first device, a message into at least two unencoded parts, encoding, by the first device, the at least two unencoded parts, thereby producing at least two encoded parts, and securing, by the first device, the at least two encoded parts, thereby producing the encoded and secured message comprising the at least two parts.

In a third implementation form of the method according to the first aspect as such or any preceding implementation form of the first aspect, encoding comprising channel encoding and securing comprising security encoding.

In a fourth implementation form of the method according to the first aspect as such or any preceding implementation form of the first aspect, further comprising interleaving, by the first device, the encoded and secured message.

In a fifth implementation form of the method according to the first aspect as such or any preceding implementation form of the first aspect, transmitting the at least two parts occurs over different time resources.

In a sixth implementation form of the method according to the first aspect as such or any preceding implementation form of the first aspect, further comprising determining, by the first device, the at least two BPLs.

In a seventh implementation form of the method according to the first aspect as such or any preceding implementation form of the first aspect, determining the at least two BPLs comprising sounding, by the first device, reference signals using transmit beams associated with the first device, receiving, by the first device, from the second device, indices of BPLs associated with received reference signals exceeding a signal strength threshold, and selecting, by the first device, the at least two BPLs from BPLs associated with the indices of BPLs received from the second device.

In an eighth implementation form of the method according to the first aspect as such or any preceding implementation form of the first aspect, further comprising transmitting, by the first device, an indicator of the at least two BPLs.

According to a second aspect, a method implemented by a second device is provided. The method comprising receiving, by the second device, from a first device, at least two parts of an encoded and secured message over at least two BPLs, each part of the at least two parts being received over a single BPL, and generating, by the second device, a received message from the at least two parts of the encoded and secured message.

In a first implementation form of the method according to the second aspect as such, generating the received message comprising unsecuring, by the second device, the at least two parts of the encoded and secured message, thereby producing at least two encoded parts, combining, by the second device, the at least two encoded parts, and decoding, by the second device, the combined parts, thereby producing the received message.

In a second implementation form of the method according to the second aspect as such or any preceding implementation form of the second aspect, generating the received message comprising unsecuring, by the second device, the at least two parts of the encoded and secured message, thereby producing at least two encoded parts, decoding, by the second device, the at least two encoded parts, thereby producing at least two unencoded parts, and combining, by the second device, the at least two unencoded parts, thereby producing the received message.

In a third implementation form of the method according to the second aspect as such or any preceding implementation form of the second aspect, decoding comprising channel decoding and unsecuring comprising security decoding.

In a fourth implementation form of the method according to the second aspect as such or any preceding implementation form of the second aspect, further comprising de-interleaving, by the first device, the at least two parts of the encoded and secured message.

In a fifth implementation form of the method according to the second aspect as such or any preceding implementation form of the second aspect, further comprising determining, by the second device, BPLs associated with the second device and the first device.

In a sixth implementation form of the method according to the second aspect as such or any preceding implementation form of the second aspect, determining the BPLs associated with the second device and the first device comprising receiving, by the second device, from the first device, beamformed reference signals using receive beams associated with the second device, and transmitting, by the second device, to the first device, indices of BPLs associated with received reference signals exceeding a signal strength threshold.

In a seventh implementation form of the method according to the second aspect as such or any preceding implementation form of the second aspect, further comprising receiving, by the second device, from the first device, an indicator of the at least two BPLs.

According to a third aspect, a method implemented by a device is provided. The method comprising generating, by the device, control information comprising a first indicator indicating a total number of secured and encoded parts of a second message, a second indicator indicating an ordering index of a first secured and encoded part scheduled by control information in the control information, and a third indicator indicating a BPL index used to communicate the first secured and encoded part scheduled by control information in the control information, and transmitting, by the device, the control information.

In a first implementation form of the method according to the third aspect as such, the control information being transmitted using one of downlink control information (DCI) message, radio resource control (RRC) message, or a media access control (MAC) control element (CE) message.

In a second implementation form of the method according to the third aspect as such or any preceding implementation form of the third aspect, the control information further comprising a fourth indicator indicating a time or frequency location of a radio resource conveying the control information.

According to a fourth aspect, a first device is provided. The first device comprising one or more processors, and a non-transitory memory storage comprising instructions that, when executed by the one or more processors, cause the first device to generate an encoded and secured message comprising at least two parts, and transmit, to a second device, the at least two parts of the encoded and secured message over at least two BPLs associated with the first device and the second device, each part of the at least two parts being transmitted over a single BPL.

In a first implementation form of the first device according to the fourth aspect as such, the instructions further cause the first device to encode a message, thereby producing an encoded message, split the encoded message into at least two encoded parts, and secure the at least two encoded parts, thereby producing the encoded and secured message comprising the at least two parts.

In a second implementation form of the first device according to the fourth aspect as such or any preceding implementation form of the fourth aspect, the instructions further cause the first device to split a message into at least two unencoded parts, the at least two unencoded parts, thereby producing at least two encoded parts, and secure the at least two encoded parts, thereby producing the encoded and secured message comprising the at least two parts.

In a second implementation form of the first device according to the fourth aspect as such or any preceding implementation form of the fourth aspect, the instructions further cause the first device to interleave the encoded and secured message.

In a second implementation form of the first device according to the fourth aspect as such or any preceding implementation form of the fourth aspect, the instructions further cause the first device to determine the at least two BPLs.

According to a fifth aspect, a first device is provided. The first device comprising one or more processors, and a non-transitory memory storage comprising instructions that, when executed by the one or more processors, cause the first device to receive, from a second device, at least two parts of an encoded and secured message over at least two BPLs, each part of the at least two parts being received over a single BPL, and generate a received message from the at least two parts of the encoded and secured message.

In a first implementation form of the first device according to the fifth aspect as such, the instructions further cause the first device to unsecure the at least two parts of the encoded and secured message, thereby producing at least two encoded parts, combine the at least two encoded parts, and decode the combined parts, thereby producing the received message.

In a second implementation form of the first device according to the fifth aspect as such or any preceding implementation form of the fourth aspect, the instructions further cause the first device to unsecure the at least two parts of the encoded and secured message, thereby producing at least two encoded parts, decode the at least two encoded parts, thereby producing at least two unencoded parts, and combine the at least two unencoded parts, thereby producing the received message.

In a third implementation form of the first device according to the fifth aspect as such or any preceding implementation form of the fourth aspect, the instructions further cause the first device to de-interleave the at least two parts of the encoded and secured message.

In a fourth implementation form of the first device according to the fifth aspect as such or any preceding implementation form of the fourth aspect, the instructions further cause the first device to determine BPLs associated with the first device and the second device.

In a fifth implementation form of the first device according to the fifth aspect as such or any preceding implementation form of the fourth aspect, the instructions further cause the first device to receive, from the second device, an indicator of the at least two BPLs.

An advantage of a preferred embodiment is that the high pathloss nature of high frequency (HF) communications is exploited to achieve low network layer security for transmissions. Hence, processing and communications overhead associated with securing the transmissions is lower than when higher network layer security is used.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9A illustrates a flow diagram of example high-level operations occurring in an intended recipient receiving a secured message from a TD according to example embodiments presented herein;

FIG. 9B illustrates a flow diagram of example operations occurring in an intended recipient receiving a secured message from a TD according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
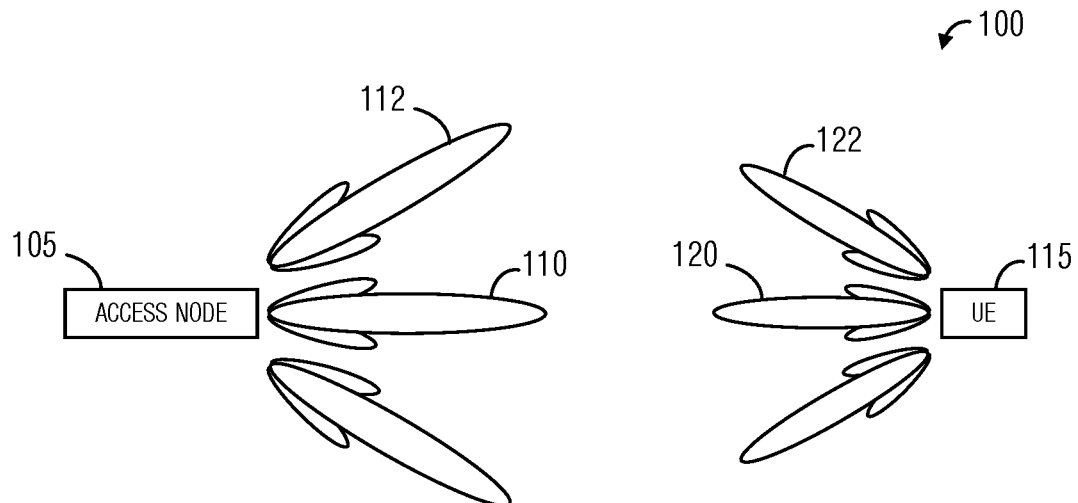
FIG. 1 illustrates an example communications system.

FIG. 1 illustrates an example communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, NR, High Speed Packet Access (HSPA), Wi-Fi 802.11a/b/g/n/ac/ad/ax/ay, etc. While it is understood that communications systems may employ multiple eNBs capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies, is high, and beamforming may be used to overcome the high pathloss. As shown in FIG. 1, both access node 105 and UE 115 communicate using beamformed transmissions and receptions. As an example, access node 105 communicates using a plurality of communications beams, including beams no and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
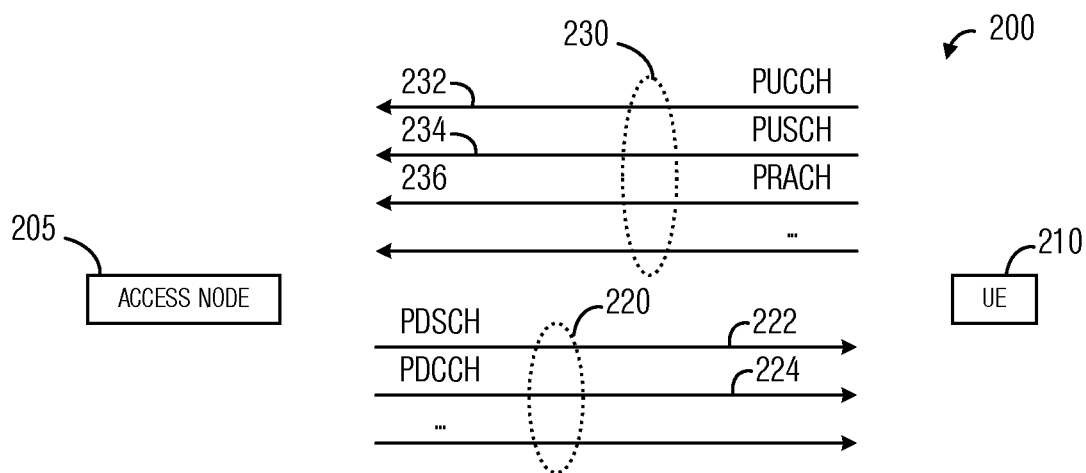
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels may be present in downlink channel 220 or uplink channel 230 but are not shown in FIG. 2.

Figure 3:
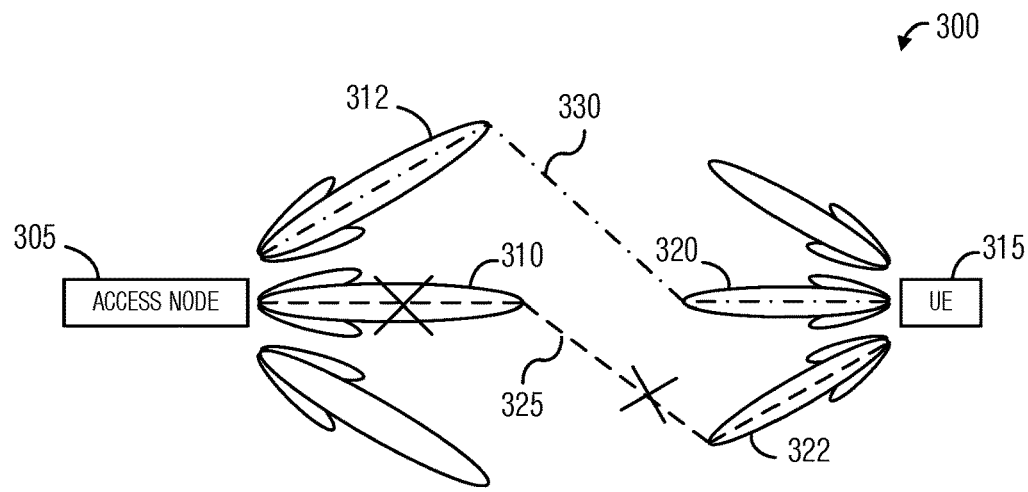
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

In general, a communications beam may be characterized by its beamforming gain and beamwidth, with the beamwidth being specified in degrees. The beamforming gain (and therefore, signal strength) typically drops off rapidly at angles outside of the beamwidth. Therefore, a receiving device (e.g., an intended recipient of a transmission) that is located significantly outside of an area covered by the communications beam is unlikely to be able successfully receive and decode the transmission. This situation is further exacerbated when transmissions reflect off one or more reflective surfaces because the reflections can further reduce the signal strength. Additionally, the length of the paths of the reflected transmissions are also longer (when compared to a line of sight path) and suffer greater pathloss.

Figure 4:
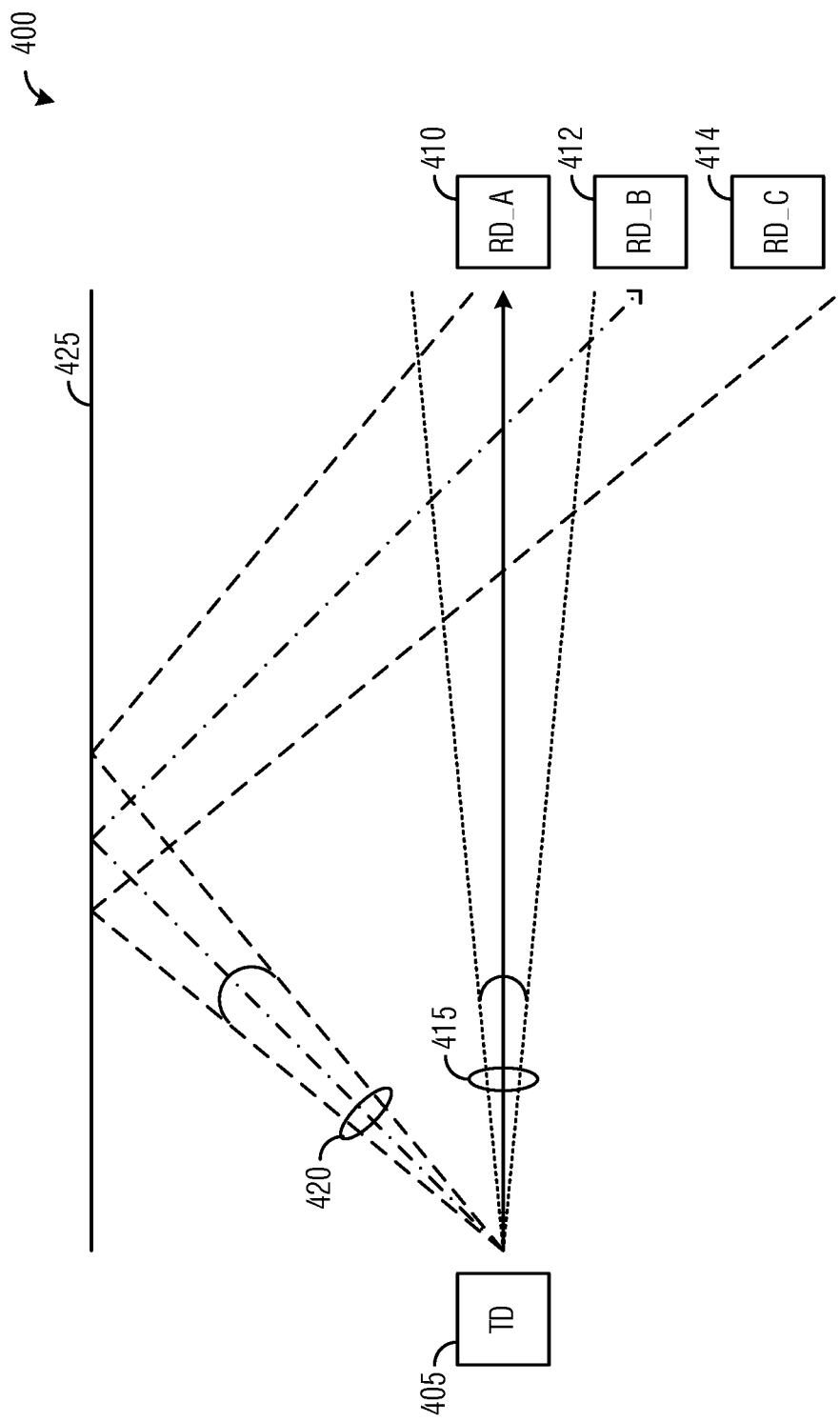
FIG. 4 illustrates a communications system highlighting the impact of beamwidth on the successful reception of transmissions.

FIG. 4 illustrates a communications system 400 highlighting the impact of beamwidth on the successful reception of transmissions. Communications system 400 includes a transmitting device (TD) 405 and three receiving devices (RDs), RD_A 410, RD_B 412, and RD_C 414. In general, a TD is the originator of a transmission (e.g., an access node in a downlink transmission, or a UE in an uplink transmission). As shown in FIG. 4, TD 405 makes two transmissions, transmission 415 and transmission 420. The two transmissions are made using different transmission beams, so they leave TD 405 at different angles.

The transmission beam of transmission 415 is directly oriented towards RD_A 410, so RD_A 410 is likely to receive transmission 415 with maximum signal strength. However, the beamwidth of the transmission beam is insufficiently wide, so RD_B 412 is slightly outside the edge of the coverage of the transmission beam. Therefore, RD_B 412 receives transmission 415 with lower signal strength than RD_A 410. However, there is still high likelihood that RD_B 412 will be able to successfully receive and decode transmission 415. On the other hand, RD_C 414 is located far outside the coverage of the transmission beam, so the likelihood that RD_C 414 will be able to successfully receive and decode transmission 415 is low. The beam of transmission 415 is referred to a line of sight (LOS) beam because transmission 415 traverses a line of sight path between TD 405 and RD_A 410. There is only one LOS beam between any TD-RD pair when single polarization transmissions are considered.

The transmission beam of transmission 420 is oriented towards a wall 425. Transmission 420 reflects off wall 425 and towards the three RDs. As shown in FIG. 4B, RD_B 412 is located right in the middle of the coverage of the transmission beam, and RD_A 410 and RD_C 414 are located at the edges of the coverage of the transmission beam. Hence, if the length of the path of transmission 42 is not too long, the likelihood of RD_B 412 successfully receiving and decoding transmission 420 is very good, while likelihood of RD_A 410 and RD_C 414 successfully receiving and decoding transmission 420 is also good (but lower than that of RD_B 412). If the length of the path of transmission 420 is too long, then the pathloss incurred by transmission 420 will result in poor signal quality, independent of where the RD is in the coverage of transmission 420.

Because transmission 420 reflects off one surface (wall 425) between TD 405 and RD_B 412, the transmission beam of transmission 420 is referred to as a first order reflection beam. Similarly, if a transmission reflects off two surfaces, the transmission beam of the transmission is referred to as a second order reflection beam, and so on. In an environment with N reflective surfaces, there are at most N first order reflection beams. As an example, in a room, there are 6 reflective surfaces (4 walls, 1 ceiling, and 1 floor), hence, there are at most 6 first order reflection beams.

As seen in the discussion of FIG. 4, transmission 415 may be received by only RD_A 410 (and possibly RD_B 412) and not RD_C 414, while transmission 420 may be received by all three RDs.

According to an example embodiment, the highly directional nature of beamformed communications at HF and above, such as mmWave operating frequencies, is utilized to provide lowest-level network layer security for transmissions. At the lowest-level network layer, such as the physical (PHY) layer, techniques for transmitting and receiving raw bits are provided, along with communications algorithm processing, such as channel coding. Therefore, complex security techniques are not implemented in the PHY layer. However, security can still be applied to transmissions at the PHY layer.

In an embodiment, a technique for providing PHY layer security to a transmission includes applying a security code to the message of the transmission and splitting the encoded message into a plurality of parts, which may then be transmitted over different BPLs to an intended recipient. The splitting of the encoded message may be performed in any of a variety of ways. As an example, if the encoded message is K bits long and the encoded message is to be split into M parts, the first part comprises the first K/M bits, the second part comprises the second K/M bits, and so on. As another example, if the encoded message is K bits long and the encoded message is to be split into M parts, the first part comprises the N*K/M bits, with N=0 . . . M−1, the second part comprises (N*K/M)+1 bits, and so on. As another example, each of the parts includes any arbitrary pattern of bits, as long as no bit is shared between parts. As another example, each of the parts includes any arbitrary pattern of bits, with bit sharing between parts allowed. In general, any possible way to partition the encoded message is possible as long as both communicating devices know the partitioning of the encoded message. The security code applied to the message of the transmission being designed such that all of the parts are needed in order to recover the message. In other words, if all of the parts are not available at a recipient, then the recipient will not be able to recover the message.

In an embodiment, the highly directional nature of beamformed communications at HF helps to ensure that an unintended recipient that is not located in close proximity to an intended recipient will be unable to receive all of the parts of a transmission, given that the different parts of the transmission are transmitted over at least two different BPLs, thereby preventing the unintended recipient from recovering a secured message contained within the transmission because all parts of the transmission are needed to recover the secured message.

Figure 5:
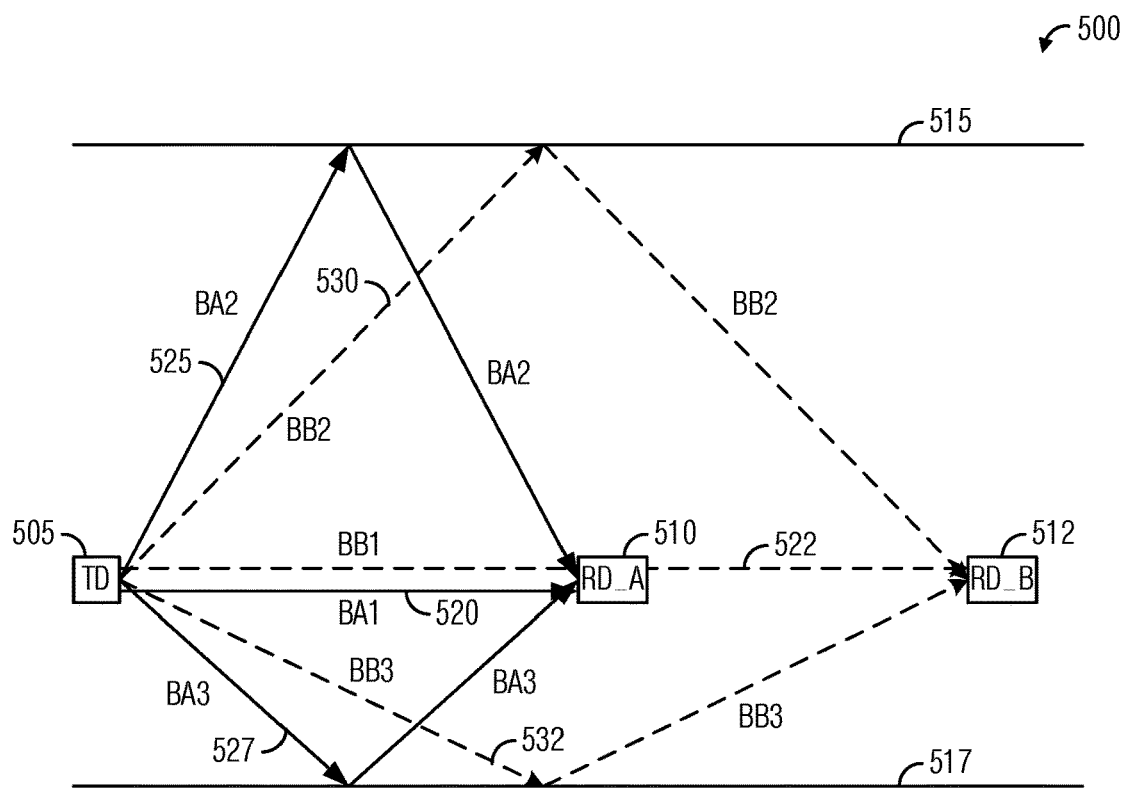
FIG. 5 illustrates an example communications system highlighting the use of beamformed communications to secure transmissions according to example embodiments presented herein.

FIG. 5 illustrates an example communications system 500 highlighting the use of beamformed communications to secure transmissions. Communications system 500 includes a TD 505 communicating with a first RD (RD_A) 510, as well as a second RD (RD_B) 512. RD_B 512 may be another RD in communications system 500, or RD_B 512 may be an eavesdropper intent upon eavesdropping on the communications between TD 505 and RD_A 510. As shown in FIG. 5, the operating environment of communications system 500 includes reflective surfaces 515 and 517.

Transmission paths between TD 505 and RD_A 510 are shown as solid arrowed lines. Transmission paths between TD 505 and RD_B 512 (intentional or not) are shown as dashed arrowed lines. There is one LOS path (BA1) 520 between TD 505 and RD_A 510. There is also one LOS path (BB1) 522 between TD 505 and RD_B 512.

Because there are two reflective surfaces, there are at most two first order reflection paths between TD 505 and RD_A 510 (as well as between TD 505 and RD_B 512). The two first order reflection paths between TD 505 and RD_A 510 are BA2 525 and BA3 527. Similarly, the two first order reflection paths between TD 505 and RD_B 512 are BB2 530 and BB3 532.

The intersection of these paths defines a position of the RD. The paths may define the position of the RD in a process similar to triangulation. As an example, the intersection of BA1 520, BA2 525, and BA3 527 defines the position of RD_A 510. Similarly, the intersection of BB1 522, BB2 530, and BB3 532 defines the position of RD_B 512. In general, larger numbers of paths defining the position of the RD result in a more precise position for the RD. As an example, in a situation with two paths defining the position of the RD, a measure of uncertainty related to the position of the RD would be greater than in a situation with three paths defining the position of the RD.

For each path, there is an associated BPL. There is a transmit beam at the TD and a receive beam at the RD. In general, unless two RDs are in close proximity, the paths between a TD and each of the two RDs will differ by at least one beam. As an example, BA2 525 is a first order reflection path between TD 505 and RD_A 510, and BB2 530 is a first order reflection path between TD 505 and RD_B 512. Because RD_A 510 and RD_B 512 are not in close proximity to each other, the BPLs associated with BA2 525 and BB2 530 may differ in transmit beam, receive beam, or both transmit beam and receive beam.

In a situation where one or more beams associated with two paths differ, it is unlikely that a second RD will be able to receive a transmission, from a TD, that is intended for a first RD if the transmission is made using the BPL associated with the path between the TD and the first RD. As shown in FIG. 5, RD_B 512 is unlikely to be able to receive a transmission made by TD 505 to RD_A 510 over BA2 525. Hence, in order to ensure that a RD receives a transmission, the RD has to be located at or in close proximity to where the TD expects the RD to be located. Therefore, an eavesdropper that is not located close to the intended recipient will be unable to receive the transmission. The closeness that the eavesdropper has to be to the intended recipient to receive the transmission for the intended recipient may be dependent upon the beamwidths of the beams used in the communication.

A path may be referenced by its associated BPL, i.e., the BPL that is used to transmit and receive a message over the path. Therefore, without loss of generality, the associated BPL may also be used to refer to the path that is associated with the BPL.

Figure 6:
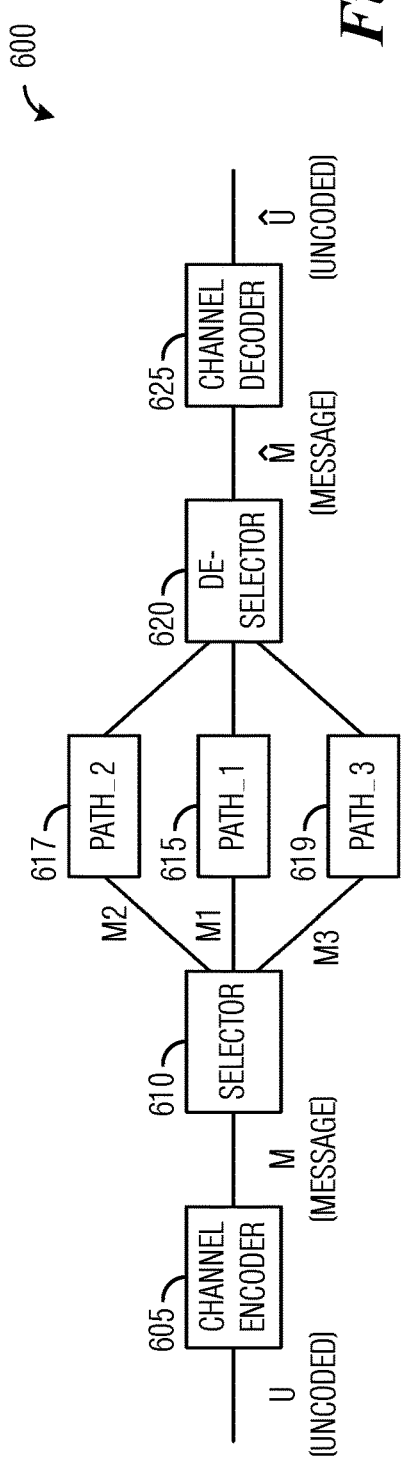
FIG. 6 illustrates a diagram highlighting a prior art technique for the TD transmitting a message and the RD receiving the message.

FIG. 6 illustrates a diagram 600 highlighting a prior art technique for the TD transmitting a message and the RD receiving the message. The prior art technique begins with the TD encoding 605 an unencoded message U to improve transmission performance. The encoding of the message is performed using a channel encoder, for example. The encoding produces an encoded message M. A selector 610 duplicates the encoded message M into multiple parts. As shown in FIG. 6, the encoded message M is duplicated into three copies, M1, M2, and M3, however, other numbers of copies are possible. The copies may be identical, information wise. The multiple copies are transmitted to the RD, with each copy transmitted over a different path. As shown in FIG. 6, copy M1 is transmitted over path PATH_1 615, copy M2 is transmitted over path PATH_2 617, and copy M3 is transmitted over path PATH_3 619. The RD receives the copies, M^1, M^2, and M^3, and de-selects the copies using a de-selector 620, to produce a received version of the encoded message M ^. The RD decodes the received version of the encoded message M^ to produce a received version of the unencoded message U^.

According to an example embodiment, a technique for providing PHY layer security includes transmitting a message, that is partitioned into two or more parts, using two or more BPLs or over two or more paths to an intended recipient, where the message is secured so that all parts are needed in order to recover the message, and any one part is only transmitted using a single BPL (or over a single path). Transmitting the parts of the message using two or more BPLs (or over two or more paths) helps to increase the probability that only the intended recipient will receive all of the parts of the message, which will enable only the intended receiver to successfully decode the message. Transmitting any one part using a single BPL (or over only a single path) also helps to ensure that only the intended recipient will receive all of the parts of the message because transmitting any one part using a single BPL (as opposed to transmitting any one part using multiple BPLs) reduces the probability that an eavesdropper will be able to receive all of the parts of the message. The probability that the eavesdropper will be able to receive all of the parts of the message is reduced because the eavesdropper will need to be in the same location as the intended recipient to receive all parts of the message if no one part of the message is transmitted over more than one BPL. If any one part of the message is transmitted over more than one BPL, the eavesdropper may not need to be in as close proximity to the intended recipient, in order to receive all parts of the message.

Figure 7:
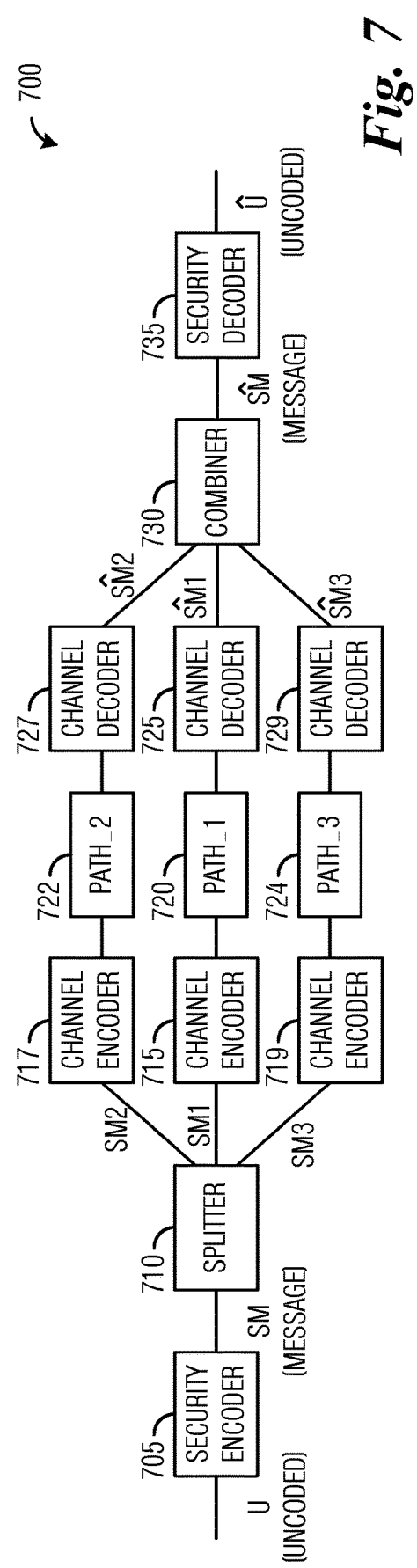
FIG. 7 illustrates a diagram highlighting an example technique for the TD transmitting a message and the RD receiving the message, highlighting the providing of PHY layer security for the message according to example embodiments presented herein.

FIG. 7 illustrates a diagram 700 highlighting an example technique for the TD transmitting a message and the RD receiving the message, highlighting the providing of PHY layer security for the message. The TD uses a security encoder 705 to encode an unencoded message U with a security code. The security code ensures that the message be recoverable only if all parts of the message are available. The security encoding produces a secured message SM. A splitter 710 splits the secured message SM include a plurality of parts. As shown in FIG. 7, splitter 710 splits the secured message SM into three parts, SM1, SM2, and SM3. Other numbers of parts are possible, including 2, 4, 5, etc. The TD applies an encoder (such as channel encoders 717-719) to each part of the plurality of parts to improve transmission performance. In an embodiment, different channel encoders are used. In another embodiment, a single channel encoder is used.

The encoding produces secured and encoded parts, which are transmitted to the RD. As shown in FIG. 7, each secured and encoded part is transmitted over a different path (such as PATH_1 720, PATH_2 722, and PATH_3 724) to the RD. Although shown in FIG. 7 as each secured and encoded part being transmitted to the RD over a different path, example embodiments are operable with multiple secured and encoded parts being transmitted over a path, as long as each secured and encoded part is transmitted over only one path to the RD. By transmitting a secured and encoded part over only one path, the probability of an eavesdropper receiving the secured and encoded part is reduced.

In an embodiment, the secured and encoded parts may be transmitted over the different paths at different times, different frequencies, different codes, or a combination thereof. The transmissions may be limited by the capabilities of the intended recipient, which may not be able to receive multiple transmissions simultaneously, for example. Alternatively, the intended recipient may be able to receive two simultaneous transmissions, but not three, for example.

Allowing multiple secured and encoded parts to be transmitted over a path, path utilization is increased, while reducing the number of paths needed to support secured communications. As an example, consider a situation where a secured message is split into five parts. If the transmission of multiple secured and encoded parts is not allowed, then five different paths will be needed to support the secured communications as described above. Such a large number of paths may not be available in many deployment situations. However, if multiple secured and encoded parts are allowed to be transmitted over a single path, then a smaller number of different paths is needed.

The RD receives the secured and encoded parts over the different paths, and applies a channel decoder (such as channel decoders 725-729), to produce received versions of the secured parts of the encoded message $\widetilde{SM}1$, $\widetilde{SM}2$, and $\widetilde{SM}3$. In an embodiment, different channel decoders are used. In another embodiment, a single channel decoder decodes the received secured and encoded parts. A combiner 730 combines the secured parts of the encoded message to produce a received version of the secured message $\hat{M}$. A security decoder 735 reconstructs the message $\hat{U}$ from received version of the secured message $\hat{M}$. As discussed previously, security decoder 735 needs every part of encoded message in order to reconstruct the message $\hat{U}$.

According to an example embodiment, the TD uses BPLs or paths that are associated with the intended recipient to transmit the message to the intended recipient in a secured manner. As an example, the TD and the intended recipient performs a beam management process to identify the BPLs or paths between the TD and the intended recipient. In an example beam management process, the TD may transmit beamformed reference signals over its available transmit beams and the intended recipient cycles through its own receive beams to detect the reference signals. The intended recipient reports to the TD information regarding the reference signals that it was able to detect and which receive beam detected the reference signals. In other words, the intended recipient reports information about the BPLs that form the paths between the intended recipient and the TD.

The TD may then select a subset of the identified BPLs or paths to associate with the intended recipient. As an example, the TD may select the BPL of the LOS path, as well as the BPLs of any first order reflection paths. If there are more BPLs or paths, the TD may select the BPLs or paths with the highest signal strength, signal plus interference to noise ratio (SINR), signal to noise ratio (SNR), etc. Typically, the larger the number of BPLs or paths selected by the TD results in increased security because the likelihood of the eavesdropper being able to receive all parts of the message decreases with the number of BPLs or paths used.

The TD may share information about the selected BPLs or paths with the intended recipient. In an embodiment, the TD shares information about the selected BPLs or paths each time there is a change in the selected BPLs or paths. In another embodiment, the TD shares information about the selected BPLs or paths periodically.

The beam management process may be performed when the intended recipient initially attaches with the TD, after a mobility event (such as a handover), when signal quality (e.g, signal strength, SINR, SNR, etc.) drops below a signal quality threshold, when an error rate (e.g., frame error rate (FER), packet error rate (PER), and so on) exceeds an error rate threshold, and so forth.

The TD transmits the secured parts of the message over the BPLs or paths to the intended recipient, where each secured path of the message is transmitted only on one BPL or path. In an embodiment, the TD generates as many secured parts as there are BPLs or paths associated with the intended recipient and transmits one secured part per BPL or path. In another embodiment, the TD generates more secured parts than there are BPLs or paths associated with the intended recipient and transmits a subset of secured parts per BPL or path, while ensuring that no secured part is transmitted on more than one BPL or path.

Figures 8A, 8B:
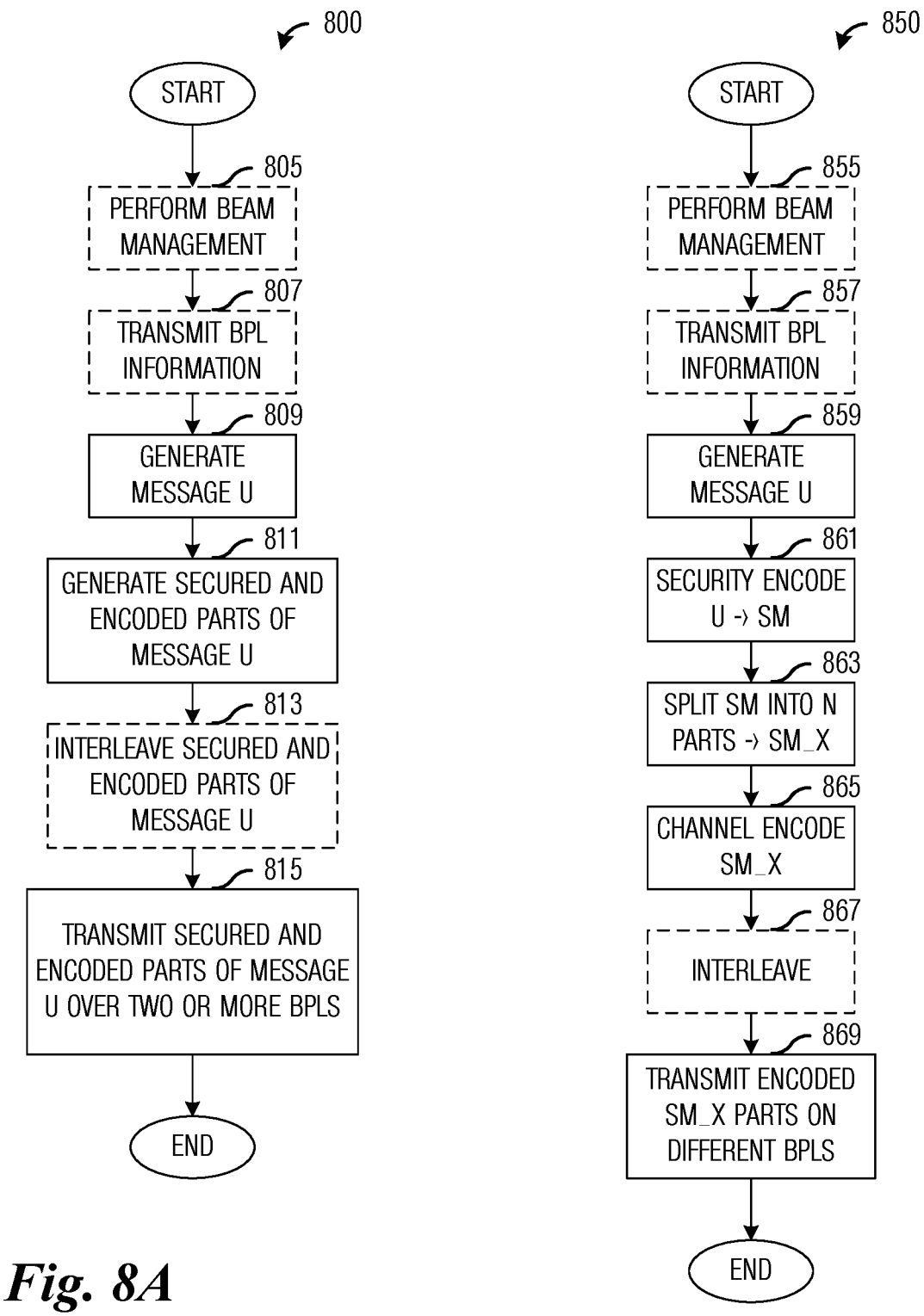
FIG. 8A illustrates a flow diagram of example high-level operations occurring in a TD transmitting a secured message to an intended recipient according to example embodiments presented herein.
FIG. 8B illustrates a flow diagram of example operations occurring in a TD transmitting a secured message to an intended recipient according to example embodiments presented herein.

FIG. 8A illustrates a flow diagram of example high-level operations 800 occurring in a TD transmitting a secured message to an intended recipient. Operations 800 may be indicative of operations occurring in a TD as the TD transmits a secured message to an intended recipient.

Operations 800 may begin with the TD performing a beam management process with the intended recipient (block 805). The beam management process may be performed when the intended recipient initially attaches with the TD, after a mobility event (such as a handover), when signal quality (e.g, signal strength, SINR, SNR, etc.) drops below a signal quality threshold, when an error rate (e.g., FER, PER, and so on) exceeds an error rate threshold, and so forth. The TD may transmit information about the BPLs or paths to the intended recipient (block 807). The information transmitted to the intended recipient may be a subset of the BPLs or paths identified in the beam management process, e.g., the BPLs or paths with the best signal quality, for example. The information transmitted to the intended recipient may also include a number of parts to expect. In an embodiment, the number of parts to expect may be explicitly signaled to the intended recipient. In another embodiment, the number of parts to expect may be implicitly signaled, as an example, the number of parts to expect is equal to the number of BPLs or paths indicated in the information transmitted by the TD.

The TD generates a message U (block 809). The message U is the message that the TD intends to transmit to the intended recipient in a secured manner. The message U may include data, control information, or a combination of data and control information. The TD generates secured and encoded parts of the message U (block 811). In an example, the TD generates the secured and encoded parts by applying a security code to the message U and then splitting the secured message into a plurality of parts, which are then channel encoded.

The TD may interleave the secured and encoded parts of the message U (block 813). As an example, the secured and encoded parts of the message U may be bit-interleaved. Bit interleaving may further enhance the security by having the bits making up a single part being transmitted over a single BPL or path not necessarily being consecutive bits of the message U. The interleaving may be performed on a per part basis or in between parts. The TD transmits the secured and encoded parts over the BPLs or paths associated with the intended recipient (block 815). The secured and encoded parts are transmitted in such a way that no individual part is transmitted over more than one BPL or path.

In an embodiment, in the downlink, each of the secured and encoded parts may be transmitted using a physical downlink shared channel (PDSCH), with each PDSCH being scheduled using downlink control information (DCI).

The DCI may be transmitted by the TD, which may be an access node in the downlink. The DCI is transmitted over a physical downlink control channel (PDCCH). Although the discussion focusses on the DCI being used to convey information regarding the scheduling of the transmission of the secured and encoded parts, the information may also be conveyed using configuration message, such as a radio resource control (RRC) message or a media access control (MAC) control element (CE) message, for example.

In an embodiment, the DCI may include the following:
N: a total number of secured and encoded parts field that indicates the total number of secured and encoded parts;
X: an ordering field that indicates the ordering index of the particular secured and encoded part conveyed on the PDSCH being scheduled by the particular DCI;
B: a BPL index field that indicates the receive BPL index used to receive the particular secured and encoded part conveyed on the PDSCH being scheduled by the particular DCI;
B may be explicitly indicated as an index out of a list of BPLs, which may be signaled to the intended recipient using a higher layer configuration message, such as a RRC message or a MACCE message;
B may be implicitly indicated as an index out of a list of channel state information reference signals (CSI-RSs) or synchronization signal blocks (SSBs). The list of CSI-RS/SSBs may be signaled to the intended recipient using a higher layer configuration message, such as a RRC message or a MAC CE message. For example, if a CSI-RS with index n is signaled to the intended recipient, then the intended recipient should use a corresponding receive beam to receive the CSI-RS n to receive the secured and encoded part. This relationship may be referred to as spatial-quasi-co-location (SQCL); and
T, F: a resource in time or frequency field that indicates the time or frequency location of the radio resource.
Hence, the intended recipient knows to receive the secured and encoded part X at time T, and frequency F, using receive beam (implicitly or explicitly) indicated by B, where the secured and encoded part X is then concatenated with other N−1 secured and encoded parts to recover the message U.

In an embodiment, in the uplink, each of the secured and encoded parts may be transmitted using a physical uplink shared channel (PUSCH), with each PUSCH being scheduled by an uplink control information (UCI). The UCI may be transmitted by the intended recipient, which may be an access node in the uplink. The UCI is transmitted over a PDCCH. The UCI may include the following:
N: a total number of secured and encoded parts field that indicates the total number of secured and encoded parts;
X: an ordering field that indicates the ordering index of the particular secured and encoded part conveyed on the PUSCH being scheduled by the particular UCI;
B: a BPL index field that indicates the receive BPL index used to receive the particular secured and encoded part conveyed on the PUSCH being scheduled by the particular UCI;
B may be explicitly indicated as an index out of a list of BPLs, which may be signaled to the intended recipient using a higher layer configuration message, such as a RRC message or a MAC CE message;
B may be implicitly indicated as an index out of a list of CSI-RSs or SSBs. The list of CSI-RS/SSBs may be signaled to the intended recipient using a higher layer configuration message, such as a RRC message or a MAC CE message. For example, if a CSI-RS with index n is signaled to the intended recipient, then the intended recipient should use a corresponding transmit beam to transmit the CSI-RS n to transmit the secured and encoded part. This relationship may be referred to as SQCL; and
T, F: a resource in time or frequency field that indicates the time or frequency location of the radio resource.
Hence, the intended recipient knows to transmit the secured and encoded part X at time T, and frequency F, using receive beam (implicitly or explicitly) indicated by B, where the secured and encoded part X is then concatenated with other N−1 secured and encoded parts to recover the message U. Although the discussion focusses on the UCI being used to convey information regarding the scheduling of the transmission of the secured and encoded parts, the information may also be conveyed using configuration message, such as a RRC message or a MAC CE message, for example.

FIG. 8B illustrates a flow diagram of example operations 850 occurring in a TD transmitting a secured message to an intended recipient. Operations 850 may be indicative of operations occurring in a TD as the TD transmits a secured message to an intended recipient.

Operations 850 may begin with the TD performing a beam management process with the intended recipient (block 855). The beam management process may be performed when the intended recipient initially attaches with the TD, after a mobility event (such as a handover), when signal quality (e.g, signal strength, SINR, SNR, etc.) drops below a signal quality threshold, when an error rate (e.g., FER, PER, and so on) exceeds an error rate threshold, and so forth. The TD may transmit information about the BPLs or paths with the intended recipient (block 857). The information transmitted to the intended recipient may be a subset of the BPLs or paths identified in the beam management process, e.g., the BPLs or paths with the best signal quality, for example. The information transmitted to the intended recipient may also include a number of parts to expect. In an embodiment, the number of parts to expect may be explicitly signaled to the intended recipient. In another embodiment, the number of parts to expect may be implicitly signaled, as an example, the number of parts to expect is equal to the number of BPLs or paths indicated in the information transmitted by the TD.

The TD generates a message U (block 859). The message U is the message that the TD intends to transmit to the intended recipient in a secured manner. The message U may include data, control information, or a combination of data and control information. The TD applies a security code to the message U to produce a secured message SM (block 861). The security code applied to the message U may be designed so that all of the encoded bits of the secured message SM are needed in order to recover the message U from the secured message SM, for example. The TD splits the secured message SM into N parts, where N is an integer number greater than or equal to two (block 863). The N parts of the secured message SM are denoted as SM_X. In an embodiment, the N parts are each equal in size. In another embodiment, some of the N parts differ in size. In yet another embodiment, there is no restriction on the sizes of the N parts.

The TD channel encodes the N parts of the secured message SM (block 865). In an embodiment, the TD sequentially channel encodes the N parts. In another embodiment, the TD channel encodes the N parts in parallel. In yet another embodiment, the TD channel encodes some of the N parts in parallel, while other parts are encoded sequentially, depending on the size of the parts, for example. The TD may interleave the N encoded parts of the secured message SM (block 867). As an example, the N encoded parts of the secured message SM may be bit-interleaved. The TD transmits the secured and encoded parts over the BPLs or paths associated with the intended recipient (block 869). The secured and encoded parts are transmitted in such a way that no individual part is transmitted over more than one BPL or path.

According to an example embodiment, the intended recipient receives the secured and encoded parts of the message transmitted by the TD over multiple BPLs or paths and reconstructs the message. The intended recipient may be informed by the TD regarding which BPLs or paths will be used, as well as a number of secured and encoded parts to expect. The number of secured and encoded parts to expect may be explicitly or implicitly signaled. If the intended recipient receives all of the parts, the intended recipient may be able to recover the message. If the intended recipient does not receive all of the parts, the intended recipient will not be able to recover the message. In such a situation, the intended recipient may assert an error condition, to potentially trigger a retransmission, for example.

FIG. 9A illustrates a flow diagram of example high-level operations 900 occurring in an intended recipient receiving a secured message from a TD. Operations 900 may be indicative of operations occurring in an intended recipient as the intended recipient receives a secured message from a TD.

Operations 900 may begin with the intended recipient performing a beam management process with the TD (block 905). The beam management process may be performed when the intended recipient initially attaches with the TD, after a mobility event (such as a handover), when signal quality (e.g, signal strength, SINR, SNR, etc.) drops below a signal quality threshold, when an error rate (e.g., frame error rate (FER), packet error rate (PER), and so on) exceeds an error rate threshold, and so forth. The intended recipient may receive information about the BPLs or paths from the TD (block 907). The information received from the TD may be a subset of the BPLs or paths identified in the beam management process, e.g., the BPLs or paths with the best signal quality, for example. The information received from the TD may also include a number of parts to expect. In an embodiment, the number of parts to expect may be explicitly signaled. In another embodiment, the number of parts to expect may be implicitly signaled, as an example, the number of parts to expect is equal to the number of BPLs or paths indicated in the information received from the TD.

The intended recipient receives secured and encoded parts of the message over two or more BPLs or paths (block 909). The number of BPLs or paths was specified in the information received from the RD. The number of secured and encoded parts may have also been specified in the information received from the RD. If the intended recipient did not receive the specified number of parts (within a specified time interval, for example), the intended recipient may assert an error condition, to potentially trigger a retransmission, for example.

The intended recipient may de-interleave the received secured and encoded parts (block 911). As an example, the de-interleaving may be bit de-interleaving. The intended recipient generates a received message U from the received secured and encoded parts (block 913). In an example, the intended recipient generates the received message Û by apply a channel decoder to the received secured and encoded parts, combine the parts, and then apply a security decoder to the combined parts. The intended recipient processes the received message Û.

FIG. 9B illustrates a flow diagram of example operations 950 occurring in an intended recipient receiving a secured message from a TD. Operations 950 may be indicative of operations occurring in an intended recipient as the intended recipient receives a secured message from a TD.

Operations 900 may begin with the intended recipient performing a beam management process with the TD (block 955). The beam management process may be performed when the intended recipient initially attaches with the TD, after a mobility event (such as a handover), when signal quality (e.g, signal strength, SINR, SNR, etc.) drops below a signal quality threshold, when an error rate (e.g., frame error rate (FER), packet error rate (PER), and so on) exceeds an error rate threshold, and so forth. The intended recipient may receive information about the BPLs or paths from the TD (block 957). The information received from the TD may be a subset of the BPLs or paths identified in the beam management process, e.g., the BPLs or paths with the best signal quality, for example. The information received from the TD may also include a number of parts to expect. In an embodiment, the number of parts to expect may be explicitly signaled. In another embodiment, the number of parts to expect may be implicitly signaled, as an example, the number of parts to expect is equal to the number of BPLs or paths indicated in the information received from the TD.

The intended recipient receives N secured and encoded parts of the message over two or more BPLs or paths (block 959). The number of BPLs or paths was specified in the information received from the RD. The number of secured and encoded parts may have also been specified in the information received from the RD. If the intended recipient did not receive the specified number of parts (within a specified time interval, for example), the intended recipient may assert an error condition, to potentially trigger a retransmission, for example.

The intended recipient may de-interleave the received secured and encoded parts (block 961). As an example, the de-interleaving may be bit de-interleaving. The intended recipient applies a channel decoder to the N received secured and encoded parts to produce $\widehat{SM}\_X$ (block 963). The intended recipient combines the N received secured parts ($\widehat{SM}\_X$) into a combined received secured message $\widehat{SM}$ (block 965). The intended recipient applies a security decoder to the combined received secured message $\widehat{SM}$ to produce a received message Û (block 967). The intended recipient processes the received message Û (block 969).

Figure 10:
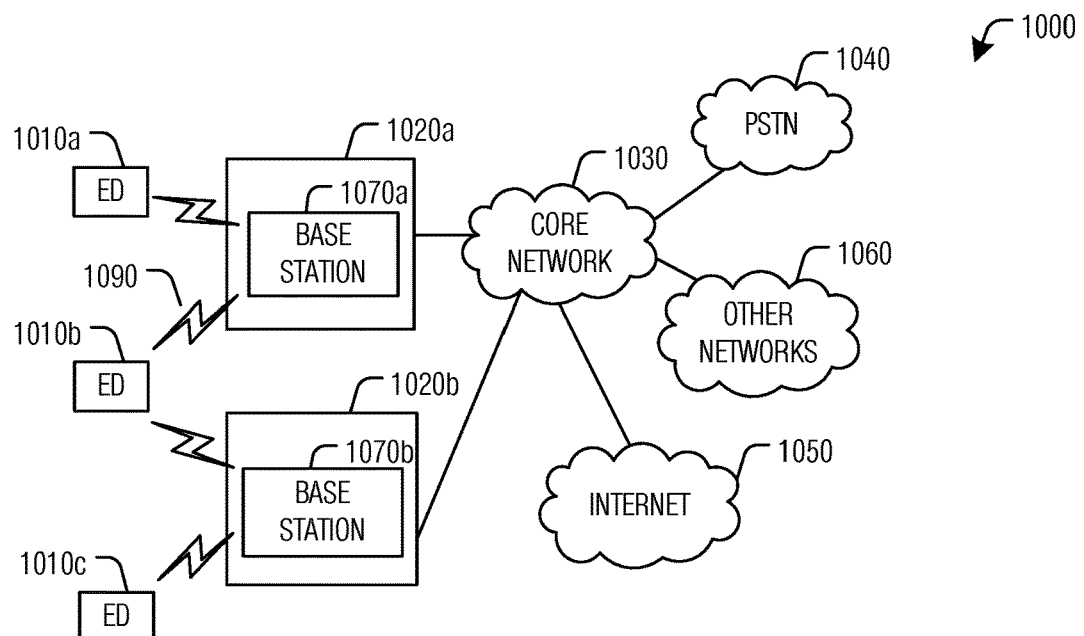
FIG. 10 illustrates an example communication system according to example embodiments presented herein.

FIG. 10 illustrates an example communication system 1000. In general, the system woo enables multiple wireless or wired users to transmit and receive data and other content. The system woo may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system woo includes electronic devices (ED) 1010a-1010c, radio access networks (RANs) 1020a-1020b, a core network 1030, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate or communicate in the system 1000. For example, the EDs 1010a-1010c are configured to transmit or receive via wireless or wired communication channels. Each ED 1010a-1010c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, or the other networks 1060. For example, the base stations 1020a-1020b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1010a-1010c are configured to interface and communicate with the Internet 1050 and may access the core network 1030, the PSTN 1040, or the other networks 1060.

In the embodiment shown in FIG. 10, the base station 1070a forms part of the RAN 1020a, which may include other base stations, elements, or devices. Also, the base station 1070b forms part of the RAN 1020b, which may include other base stations, elements, or devices. Each base station 1070a-1070b operates to transmit or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs 1010a-1010c over one or more air interfaces 1090 using wireless communication links. The air interfaces 1090 may utilize any suitable radio access technology.

It is contemplated that the system moo may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system moo could include any number of EDs, base stations, networks, or other components in any suitable configuration.

Figure 11A:
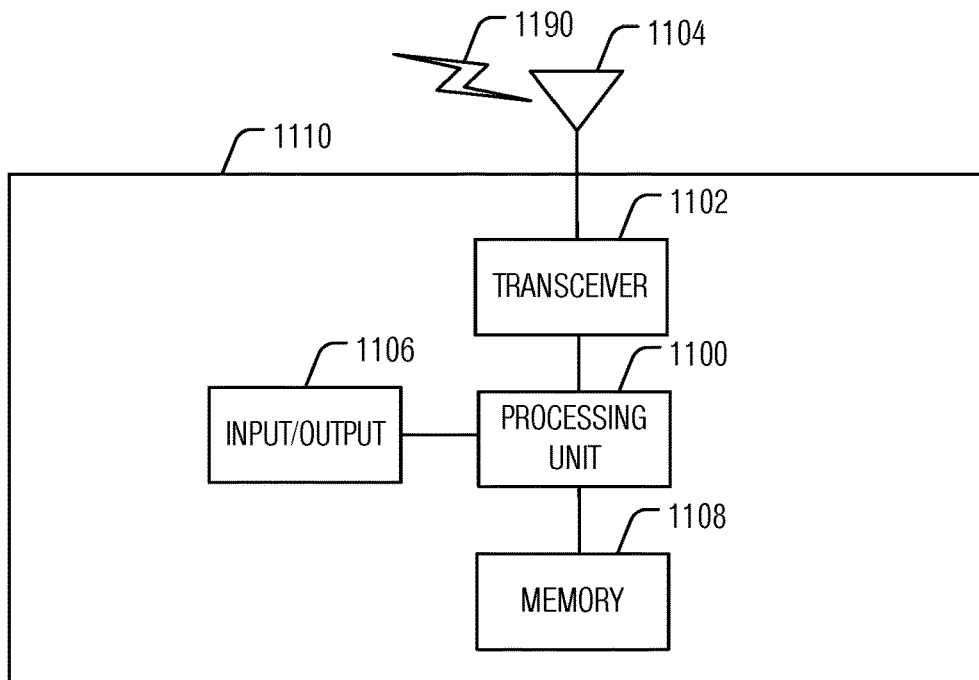
FIGS. 11A and 11B illustrate example devices that may implement the methods and teachings according to this disclosure.
Figure 11B:
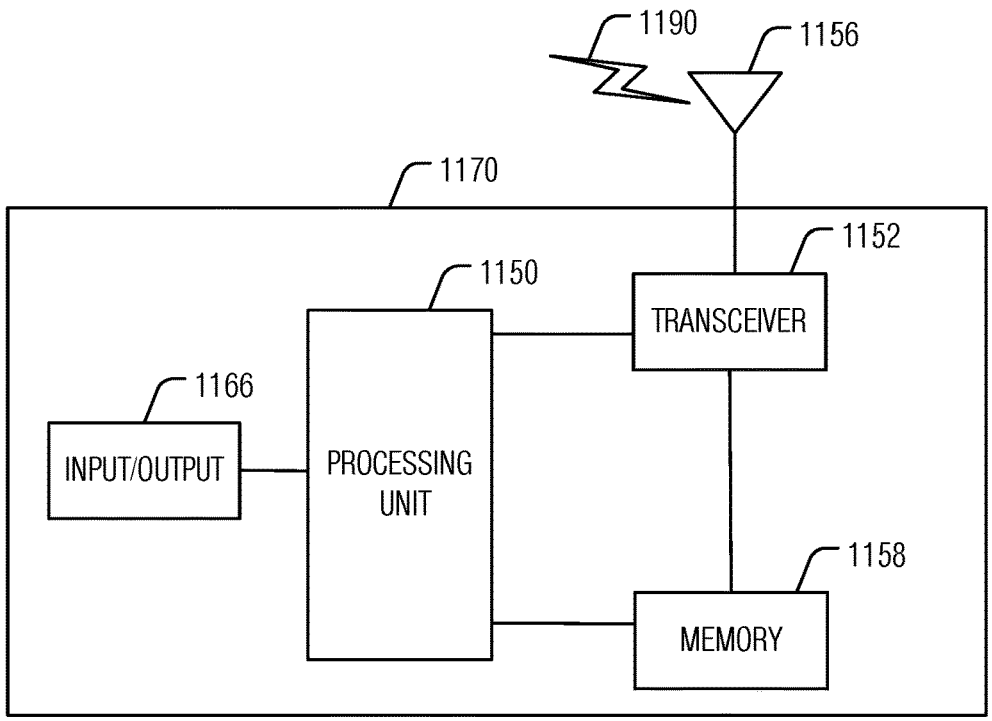

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system moo or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system 1000. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission or processing signals received wirelessly or by wire. Each antenna 1104 includes any suitable structure for transmitting or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
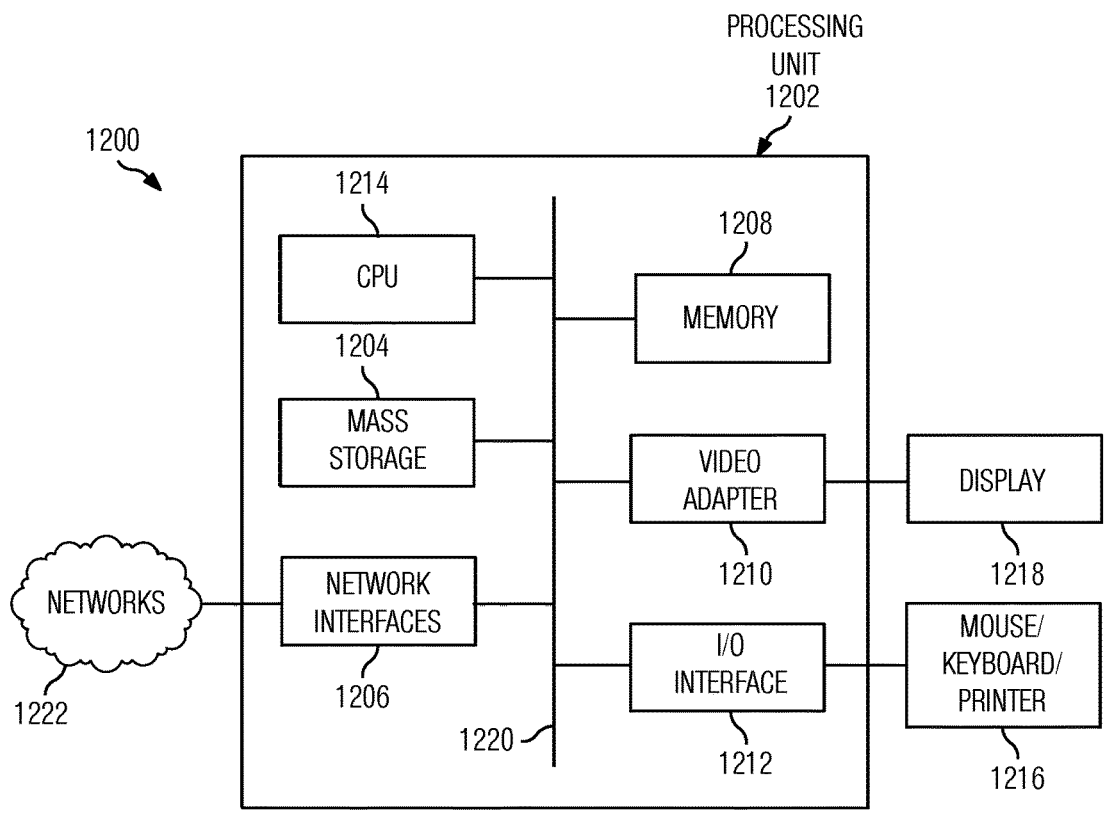
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse, keyboard, or printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit or module, a splitting unit or module, an encoding unit or module, an interleaving unit or module, a sounding unit or module, a selecting unit or module, a combining unit or module, a decoding unit or module, or a securing unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
 generating, at a physical (PHY) layer of a first device, an encoded and secured message comprising at least two parts, the generating including:
  encoding, at the PHY layer of the first device, a message to produce an encoded message, and splitting, at the PHY layer of the first device, the encoded message into at least two encoded parts; or splitting, at the PHY layer of the first device, a message into at least two unencoded parts, and encoding, at the PHY layer of the first device, the at least two unencoded parts to produce at least two encoded parts; and
  securing, at the PHY layer of the first device, the at least two encoded parts to produce the encoded and secured message comprising the at least two parts;
 transmitting, by the first device, control information indicating a total number of secured and encoded parts of the encoded and secured message; and
 after the transmitting the control information, transmitting, by the first device, the at least two parts of the encoded and secured message to a second device over at least two beam pair links (BPLs) associated with the first device and the second device, each of the at least two parts being transmitted over a single BPL.

2. The method of claim 1, wherein the encoding the message to produce the encoded message comprises channel encoding the message and the securing comprising security encoding the at least two encoded parts.

3. The method of claim 1, further comprising interleaving, by the first device, the encoded and secured message.

4. The method of claim 1, wherein the transmitting the at least two parts occurs over different time resources.

5. The method of claim 1, further comprising determining, by the first device, the at least two BPLs.

6. The method of claim 5, wherein the determining the at least two BPLs comprises:
sounding, by the first device, reference signals using transmit beams associated with the first device;
receiving, by the first device from the second device, indices of BPLs associated with received reference signals exceeding a signal strength threshold; and
selecting, by the first device, the at least two BPLs from BPLs associated with the indices of the BPLs received from the second device.

7. The method of claim 1, wherein the control information further includes an indicator of the at least two BPLs.

8. A method the method comprising:
receiving, by a second device, control information indicating a total number of secured and encoded parts of an encoded and secured message;
after the receiving the control information, receiving, by the second device, at least two parts of the encoded and secured message from a first device over at least two beam pair links (BPLs), each of the at least two parts being received over a single BPL; and
generating, at a physical (PHY) layer of the second device, a received message from the at least two parts of the encoded and secured message, the generating including:
unsecuring, at the PHY layer of the second device, the at least two parts of the encoded and secured message to produce at least two encoded parts; and
combining, at the PHY layer of the second device, the at least two encoded parts, and decoding, at the PHY layer of the second device, the combined at least two encoded parts to produce the received message; or
decoding, at the PHY layer of the second device, the at least two encoded parts to produce at least two unencoded parts, and combining, at the PHY layer of the second device, the at least two unencoded parts to produce the received message.

9. The method of claim 8, wherein the decoding the combined at least two encoded parts to produce the received message comprises channel decoding and the unsecuring comprising security decoding.

10. The method of claim 8, further comprising de-interleaving, by the first device, the at least two encoded parts of the encoded and secured message.

11. The method of claim 8, further comprising determining, by the second device, BPLs associated with the second device and the first device.

12. The method of claim 11, wherein the determining the BPLs associated with the second device and the first device comprises:
receiving, by the second device from the first device, beamformed reference signals using receive beams associated with the second device; and
transmitting, by the second device to the first device, indices of BPLs associated with received reference signals exceeding a signal strength threshold.

13. The method of claim 8, wherein the control information further includes an indicator of the at least two BPLs.

14. A method comprising:
generating, at a physical (PHY) layer of a device, a second message, the generating the second message including:
encoding, at the PHY layer of the device, a first message to produce an encoded message, and splitting, at the PHY layer of the device, the encoded message into at least two encoded parts; or
splitting, at the PHY layer of the device, a first message into at least two unencoded parts, and encoding, at the PHY layer of the device, the at least two unencoded parts to produce at least two encoded parts;
generating, by the device, control information comprising a first indicator indicating a total number of secured and encoded parts of the second message, a second indicator indicating an ordering index of a first secured and encoded part of the at least two encoded parts scheduled by the control information, and a third indicator indicating a beam pair link (BPL) index used to communicate the first secured and encoded part scheduled by the control information;
transmitting, by the device, the control information; and
after the transmitting the control information, transmitting the second message including the secured and encoded parts to a second device over at least two beam pair links (BPLs) associated with the device and the second device, each of the at least two encoded parts being transmitted over a single BPL.

15. The method of claim 14, wherein the control information is transmitted using one of downlink control information (DCI) message, radio resource control (RRC) message, or a media access control (MAC) control element (CE) message.

16. The method of claim 14, wherein the control information further comprises a fourth indicator indicating a time or frequency location of a radio resource conveying the control information.

17. A first device comprising:
one or more processors; and
a non-transitory memory storage comprising instructions that, when executed by the one or more processors, cause the first device to perform operations including:
generating, at a physical (PHY) layer of the first device, an encoded and secured message comprising at least two parts, the generating including:
encoding, at the PHY layer of the first device, a message to produce an encoded message, and splitting, at the PHY layer of the first device, the encoded message into at least two encoded parts; or splitting, at the PHY layer of the first device, a message into at least two unencoded parts, and encoding, at the PHY layer of the first device, the at least two unencoded parts to produce at least two encoded parts; and
securing, at the PHY layer of the first device, the at least two encoded parts to produce the encoded and secured message comprising the at least two parts;
transmitting control information indicating a total number of secured and encoded parts of the encoded and secured message; and
after the transmitting the control information, transmitting the at least two parts of the encoded and secured message to a second device over at least two beam pair links (BPLs) associated with the first device and the second device, each of the at least two parts being transmitted over a single BPL.

18. The first device of claim 17, wherein the operations further comprise interleaving the encoded and secured message.

19. The first device of claim 17, wherein the operations further comprise determining the at least two BPLs.

20. A first device comprising:
one or more processors; and
a non-transitory memory storage comprising instructions that, when executed by the one or more processors, cause the first device to perform operations including:
receiving control information indicating a total number of secured and encoded parts of an encoded and secured message;
after the receiving the control information, receiving at least two parts of the encoded and secured message from a second device over at least two beam pair links (BPLs), each of the at least two parts being received over a single BPL; and
generating, at a physical (PHY) layer of the first device, a received message from the at least two parts of the encoded and secured message, the generating including:
unsecuring, at the PHY layer of the first device, the at least two parts of the encoded and secured message to produce at least two encoded parts; and
combining, at the PHY layer of the first device, the at least two encoded parts, and decoding, at the PHY layer of the second device, the combined at least two encoded parts to produce the received message; or decoding, at the PHY layer of the first device, the at least two encoded parts to produce at least two unencoded parts, and combining, at the PHY layer of the second device, the at least two unencoded parts to produce the received message.

21. The first device of claim 20, wherein the operations further comprise:
determining BPLs associated with the first device and the second device.

22. The first device of claim 20, wherein the control information further includes an indicator of the at least two BPLs.

23. The first device of claim 20, wherein the operations further comprise de-interleaving the at least two encoded parts of the encoded and secured message.

24. The method of claim 1, wherein the at least two parts include at least 3 parts, and the at least two BPLs include at least 3 BPLs, and wherein the control information is in one of downlink control information (DCI), a radio resource control (RRC) message, or a media access control (MAC) control element (CE) message.

* * * * *